United States Patent Office 3,763,184
Patented Oct. 2, 1973

3,763,184
PHARMACEUTICALLY ACTIVE PYRROLIDINO-NAPHTHOTHIOPHENES
Ian Wellings, Wilmington, Del., assignor to E. I. du Pont de Nemours and Company, Wilmington, Del.
No Drawing. Continuation-in-part of abandoned application Ser. No. 6,542, Jan. 28, 1970. This application Sept. 7, 1971, Ser. No. 178,466
Int. Cl. C07d 27/48
U.S. Cl. 260—326.1
4 Claims

ABSTRACT OF THE DISCLOSURE

This invention relates to a class of novel pyrrolidino-naphthothiophenes and their use as pharmaceutical agents.

CROSS-REFERENCE TO RELATED APPLICATION

This application is a continuation-in-part of my co-pending application Ser. No. 6,542, filed Jan. 28, 1970, now abandoned.

BACKGROUND OF THE INVENTION

This invention relates to the discovery of a group of pyrrolidinonaphthothiophene derivatives which are useful as analgesics and antiviral agents.

Many pharmaceutical agents are known to be effective as analgesic agents; however, no completely satisfactory analgesic is known for the relief of deep-seated pain.

The use of opium as perhaps the first agent to alleviate deep-seated pain began before the dawn of recorded history. Little real advance in the development of improved analgesics was made until the early years of the 19th century when the German pharmacist Sertürner published his work leading to the discovery of morphine. Since this discovery extensive use has been made of morphine and other natural opium alkaloids in therapy.

Greater understanding of organic chemistry has resulted in the development of the semi-synthetic opium derivatives and the synthetic morphine substitutes.

It is to this field of analgesia, particularly of intense, deep-seated pain, that one aspect of this invention relates. The novel compound hereinafter described is effective in alleviating intense, deep-seated pain.

In addition, it has also been found that the compounds within the scope of this invention are useful in controlling herpesvirus infections of warm-blooded animals.

SUMMARY OF THE INVENTION

This invention relates to compounds of the formula:

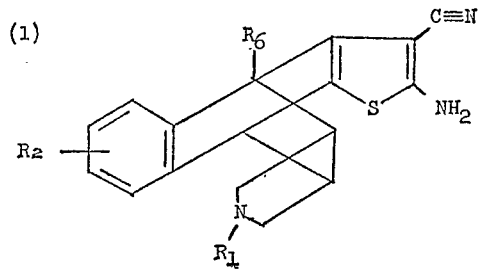

where $R_1$ is selected from the group consisting of hydrogen, alkyl of from one through six carbon atoms, alkenyl of from three through five carbon atoms, with the limitation that the double bond of said alkenyl is in other than the "1"-position, propargyl, cyclopropylmethyl or phenethyl;

$R_2$ is selected from the group consisting of H, Cl, Br, F, —$CF_3$, —$NO_2$, —$OR_3$, or

where $R_3$ is hydrogen, alkyl of from one through three carbon atoms, or

where $R_5$ is hydrogen or alkyl of one through three carbon atoms; and $R_4$ is alkyl of one through six carbon atoms;

$R_6$ is selected from the group consisting of hydrogen, alkyl of one through three carbon atoms, benzyl or phenethyl; and the pharmaceutically acceptable salts of said compounds.

This invention also relates to a method for controlling virus infections of warm-blooded animals which comprises administering to said animal an antiviral effective amount of a compound of Formula 1.

Another aspect of this invention relates to a method of alleviating pain in warm-blooded animals which comprises administering to said animal an analgetic effective amount of a compound of Formula 1.

Yet another aspect of this invention relates to pharmaceutical compositions which contain a compound of Formula 1 in combination with suitable pharmaceutical adjuvants and modifiers.

DESCRIPTION OF THE INVENTION

As summarized above, this invention relates to a group of compounds useful as pharmaceutical agents, which compounds are represented by the following formula:

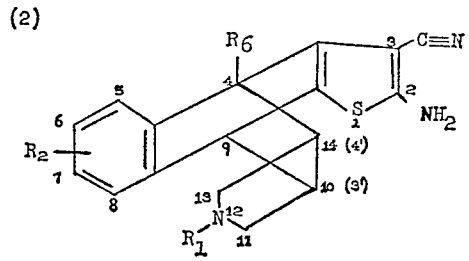

The numbering system employed in naming the compounds is indicated in the above formula. The definition of $R_1$, $R_2$ and $R_6$ is the same as that presented for the terms employed in Formula 1 above.

It will be understood that the compounds of this invention can exist in a number of isomeric forms.

For example, it is apparent from Formula 1 above that the pyrrolidine ring can be either endo- or exo- in relation to the thiophene ring. The exo- isomers of the compounds of this invention are represented by the following formula:

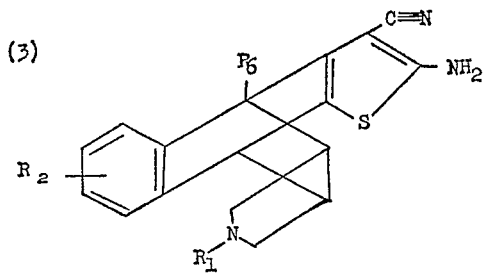

where $R_1$, $R_2$ and $R_6$ are defined as above.

The endo isomers of the compounds of this invention are represented by the following formula:

(4)

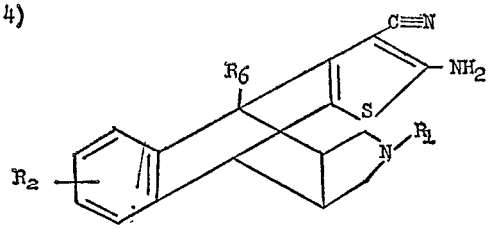

where $R_1$, $R_2$ and $R_6$ are defined as above. In addition, the compounds of this invention exist in two forms which are non-superimposable mirror images of each other. It will therefore be understood that the d- and l- optical isomers of both the endo and exo form of the compounds of Formula 1 are included within the scope of this invention.

Illustrative of the compounds of this invention are the following:

2-amino-4,9-dihydro-12H-4,9(3′,4′)-pyrrolidinonaphtho [2,3-b]thiophene-3-carbonitrile 2-amino-4,9-dihydro-12-methyl-4,9(3′,4′)-pyrrolidinonaphtho[2,3-b]thiophene-3-carbonitrile 2-amino-4,9-dihydro-12-allyl-4,9(3′,4′)-pyrrolidinonaphtho[2,3-b]thiophene-3-carbonitrile 2-amino-4,9-dihydro-7-chloro-12-propargyl-4,9(3′,4′)-pyrrolidinonaphtho[2,3-b]thiophene-3-carbonitrile 2-amino-4,9-dihydro-12-methyl-7-trifluoromethyl-4,9(3′,4′)-pyrrolidinonaphtho[2,3-b]thiophene-3-carbonitrile 2-amino-4,9-dihydro-7-hydroxy-12-methyl-4,9(3′,4′)-pyrrolidinonaphtho[2,3-b]thiophene-3-carbonitrile 2-amino-4,9-dihydro-8-propoxy-12-phenethyl-4,9(3′,4′)-pyrrolidinonaphtho[2,3-b]thiophene-3-carbonitrile 2-amino-4,9-dihydro-12-tert-butyl-4,9(3′,4′)-pyrrolidinonaphtho[2,3-b]thiophene-3-carbonitrile 2-amino-4,9-dihydro-12-pentyl-4,9(3′,4′)-pyrrolidinonaphtho[2,3-b]thiophene-3-carbonitrile 2-amino-4,9-dihydro-12-(2-butenyl)-4,9(3′,4′)-pyrrolidinonaphtho[2,3-b]thiophene-3-carbonitrile 2-amino-4,9-dihydro-12(4-pentenyl)-4,9(3′,4′)-pyrrolidinonaphtho[2,3-b]thiophene-3-carbonitrile 2-amino-4,9-dihydro-12-methyl-7-nitro-4,9(3′,4′)-pyrrolidinonaphtho[2,3-b]thiophene-3-carbonitrile 2-amino-4,9-dihydro-12-methyl-7-carboxaldehyde-4,9(3′,4′)-pyrrolidinonaphtho[2,3-b]thiophene-3-carbonitrile 2-amino-4,9-dihydro-12-methyl-7-propionyl-4,9(3′,4)-pyrrolidinonaphtho[2,3-b]thiophene-3-carbonitrile 2-amino-4,9-dihydro-12-methyl-7-trifluoromethyl-4,9(3′,4′)-pyrrolidinonaphtho[2,3-b]thiophene-3-carbonitrile 2-amino-4,9-dihydro-12-methyl-7-chloro-4,9(3′,4′)-pyrrolidinonaphtho[2,3-b]thiophene-3-carbonitrile 2-amino-4,9-dihydro-4,12-dimethyl-4,9(3′,4′)-pyrrolidinonaphtho[2,3-b]thiophene-3-carbonitrile 2-amino-4,9-dihydro-4-benzyl-12-methyl-4,9(3′,4′)-pyrrolidinonaphtho[2,3-b]thiophene-3-carbonitrile The pharmaceutically acceptable salts of the above compounds are of course also included within the scope of this invention.

It will be understood that the term "pharmaceutically acceptable salts" as used herein is intended to include non-toxic salts of the compounds of this invention with an anion. Representative of such salts are hydrochlorides, hydrobromides, sulfates, phosphates, nitrates, acetates, succinates, adipates, propionates, tartrates, maleates, citrates, bicarbonates, pamoates, cyclohexylsulfamates and acetylsalicylates.

Although some of the compounds of Formula 1 have been found to possess analgesic activity, only 2-amino-4,9-dihydro - 12 - methyl-4,9(3′,4′)-pyrrolidinonaphtho [2,3-b]thiophene-3-carbonitrile is believed to be sufficiently potent to be useful in the alleviation of intense, deep-seated pain.

However, the compounds of Formula 1, including 2-amino-4,9-dihydro - 12 - methyl-4,9(3′,4′)-pyrrolidinonaphtho[2,3-b]thiophene-3-carbonitrile have also been found to be effective in controlling herpesvirus infections. In general, the compounds preferred for use in controlling herpesvirus infections, due to their outstanding activity, are those compounds of Formula 1 wherein $R_1$ is hydrogen, alkyl, alkenyl, or cyclopropylmethyl; $R_2$ is hydrogen, Cl, F or Br and $R_6$ is hydrogen. Also preferred are these compounds where $R_1$ is phenethyl.

Of the compounds of this invention, it will be understood that the following compounds are most preferred due to their high level of antiviral activity.

2-amino-4,9-dihydro-12-methyl-4,9(3′,4′)-pyrrolidinonaphtho[2,3-b]thiophene-3-carbonitrile 2-amino-4,9-dihydro-12-ethyl-4,9(3′,4′)-pyrrolidinonaphtho[2,3-b]thiophene-3-carbonitrile 2-amino-4,9-dihydro-12-allyl-4,9(3′,4′)-pyrrolidinonaphtho[2,3-b]thiophene-3-carbonitrile 2-amino-4,9-dihydro-12-phenethyl-4,9(3′,4′)-pyrrolidinonaphtho[2,3-b]thiophene-3-carbonitrile Of the compounds of this invention useful as analgesics, the most preferred is 2-amino-4,9-dihydro-12-methyl-4,9(3′,4′)-pyrrolidinonaphtho[2,3-b]thiophene-3-carbonitrile.

PREPARATION

The compounds of this invention are prepared by treating a suitable 1,3,3a,4,9,9a-hexahydro-4,9-ethano-2H-benz[f]isoindole-10-one with sulfur, an organic base such as morpholine and malononitrile in the presence of a solvent such as ethanol.

The 1,3,3a,4,9,9a - hexahydro-4,9-ethano-2H-benz-[f]-isoindole-10-one starting materials can be prepared by treating a suitable 1,2,3,4-tetrahydro-9-oxo-1,4-ethanonaphthalene-2,3-dicarboxylic anhydride with ammonia or an appropriate amine reactant to obtain a corresponding 1,2,3,4-tetrahydro - 9 - oxo-1,4-ethanonaphthalene-2,3-dicarboximide.

The ketone at position 9 is converted to its dimethoxy derivative for protection and the remaining carbonyl groups in the imide ring are reduced with a suitable agent such as lithium aluminum hydride. Alternatively, a cyclic acetal can be formed at position 9 prior to reduction of the carbonyl groups in the imide ring. The dimethoxy or cyclic acetal compound is then acidified followed by basification to give the desired 1,3,3a,4,9,9a-hexahydro-4,9-ethano-2H-benz[f]isoindol-10-one of this invention.

The art is familiar with the preparation of various 1,2,3,4 - tetrahydro-9-oxo-1,4-ethanonaphthalene - 2,3 - dicarboxylic anhydrides suitable for use as starting materials for this invention. For example, Takeda and Kitahonoki, J. Pharm. Soc. Jap., 73, 280 (1953) teach a preparation of 1,2,3,4 - tetrahydro - 9 - oxo-1,4-ethanonaphthalene - 2,3 - exo-dicarboxylic anhydride. See also J.C.S. p. 2304, 2310 and 2311, (1956).

Other anhydride starting materials can be prepared by dehydrating an appropriate 1,4-ethanonaphthalene-2,3-dicarboxylate. Preparation of suitable dicarboxylate starting materials is known to the art. For example, Plieninger, Lehnert and Mangold, Chem. Ber., 100 2421 (1967), C.A. 67 73411C (1967) teach the preparation of anhydrides and esters of 1,2,3,4-tetrahydro-8-nitro-9-oxo-1,4-ethanonaphthalene - 2,3 - oxo - dicarboxylate. Robinson and Rydan, J.C.S., 1394 (1939) teach the preparation of 2-methoxy-6-acetylnaphthalene; and Kornblum, Seltzer and Haberfield, J.A.C.S., 85 1148 (1963) teach the preparation of 1-benzyl-2-naphthol which materials can be converted to a dicarboxylic acid anhydride by treating the naphthalene with maleic anhydride and ethyl acetate.

EXAMPLE 1

2-amino-4,9-dihydro-12-methyl-4,9(3',4')-pyrrolidinonaphtho[2,3-b]thiophene-3-carbonitrile hemihydrate A solution of 0.1 mole of malononitrile in 20 ml. of ethanol was added to a stirred mixture of 0.1 mole of 1,3,3a,4,9,9a-hexahydro-2-methyl-4,9-ethano - 2H - benz[f]isoindol-10-one, 0.11 mole of sulfur and 3.0 ml. of morpholine in a solution of 60 ml. of ethanol and 30 ml. of dimethylformamide.

The reaction mixture was then warmed to 60° C. and held at that temperature for 7 minutes under an atmosphere of nitrogen. After cooling to room temperature, the mixture was poured into 500 ml. of water containing 5 ml. of glacial acetic acid to give a precipitate which was collected by filtration.

Recrystallization from aqueous dimethylformamide gave 2 - amino - 4,9 - dihydro-12-methyl-4,9(3',4')-pyrrolidinonaphtho[2,3-b]thiophene - 3 - carbonitrile, hemihydrate, M.P. 197–198° C.

The hydrochloride of this compound was prepared by passing dry hydrogen chloride gas into an ethanolic solution of the base. The salt was recrystallized from water to give 2-amino-4,9-dihydro-12-methyl-4,9(3',4') - pyrrolidinonaphtho[2,3-b]thiophene - 3 - carbonitrile hydrochloride, M.P. 216–218° C.

EXAMPLE 2

2-amino-4,9-dihydro-12-cyclopropylmethyl-4,9(3',4'-pyrrolidinonaphtho-[2,3-b]thiophene-3-carbonitrile A solution of 0.1 mole of malononitrile in 20 ml. of ethanol was added to a stirred mixture of 0.1 mole of 1,3,3a,4,9,9a - hexahydro - 2 - cyclopropylmethyl - 4,9-ethano-2H-benz[f]isoindol-10-one, 0.11 mole of sulfur and 3.0 ml. of morpholine in a solution of 60 ml. of ethanol and 30 ml. of dimethylformamide. The reaction mixture was then warmed to 40° C. and held at that temperature for 3½ hours under an atmosphere of nitrogen. After cooling to room temperature, the mixture was poured into 500 ml. of water containing 5 ml. of glacial acetic acid to give a precipitate which was collected by filtration. Recrystallization from acetonitrile gave 2-amino - 4,9 - dihydro - 12 - cyclopropylmethyl-4,9(3',4')-pyrrolidinonaphtho[2,3-b]thiophene-3-carbonitrile, M.P. 201–202° C.

EXAMPLE 3

2-amino-4,9-dihydro-12-allyl-4,9(3',4')-pyrrolidinonaphtho[2,3-b]thiophene-3-carbonitrile A solution of 0.1 mole of malononitrile in 20 ml. of ethanol was added to a stirred mixture of 0.1 mole of 1,3,3a,4,9,9a - hexahydro - 2 - allyl - 4,9 - ethano - 2H-benz[f]isoindol-10-one, 0.11 mole of sulfur and 3.0 ml. of morpholine in a solution of 60 ml. of ethanol and 20 ml. of dimethylformamide. The reaction mixture was then warmed to 65° C. and held at that temperature for 2½ hours under an atmosphere of nitrogen. At the end of this time, a precipitate had formed. The reaction mixture was cooled to room temperature and the precipitate collected by filtration. Recrystallization from aqueous dimethylformamide gave 2-amino-4,9-dihydro-12-allyl-4,9 (3',4')pyrrolidinonaphtho[2,3-b]thiophene - 3 - carbonitrile, M.P. 214–215° C.

The hydrochloride of this compound was prepared by passing dry hydrogen chloride gas into an ethanolic solution of the base. The salt was recrystallized from aqueous ethanol to give 2-amino-4,9-dihydro-12-allyl-4,9(3',4') pyrrolidononaphtho[2,3-b]thiophene - 3 - carbonitrile hydrochloride, M.P. 259–260° C.

EXAMPLE 4

2-amino-4,9-dihydro-12-phenethyl-4,9(3',4')-pyrrolidinonaphtho[2,3-b]thiophene-3-carbonitrile By substituting 1,3,3a,4,9,9a - hexahydro-2-phenethyl-4,9-ethanol-2H-benz[f]isoindol-10-one for the ketone employed in Example 2, the corresponding 2-amino-4,9-dihydro - 12 - phenethyl - 4,9(3',4')pyrrolidinonaphtho[2,3-b]thiophene-3-carbonitrile was obtained as a crystalline solid from acetonitrile, M.P. 204–205° C.

EXAMPLE 5

2-amino-4,9-dihydro-12-ethyl-4,9(3',4')-pyrrolidino naphtho[2,3-b]thiophene-3-carbonitrile By substituting 1,3,3a,4,9,9a - hexahydro-2-ethyl-4,9-ethano-2H-benz[f]isoindol-10-one for the ketone employed in Example 2, the corresponding 2-amino-4,9-dihydro - 12 - ethyl - 4,9(3',4')pyrrolidinonaphtho[2,3-b] thiophene-3-carbonitrile was obtained as a crystalline solid from aqueous acetonitrile, M.P. 215–216° C.

EXAMPLE 6

2-amino-4,9-dihydro-7-brom-12-methyl-4,9(3',4')-pyrrolidinonaphtho[2,3-b]thiophene-3-carbonitrile A stirred mixture of 0.1 mole of 6-bromo-2-naphthol and 0.12 mole of maleic anhydride was heated at 215–220° C. for 1 hour under an atmosphere of nitrogen. After cooling to 100° C., about 100 ml. of xylene was run in and the mixture stirred at room temperature. The crude solid product was filtered, washed with xylene and recrystallized from tetrahydrofuran/ethyl ether in the presence of Norit-A to give 1,2,3,4-tetrahydro-6-bromo-9-oxo-1,4-ethanonaphthalene - 2,3 - exodicarboxylic anhydride, M.P. 228–229° C.

Dry methylamine gas was bubbled for 1 hour into a stirred suspension of 0.1 mole of 1,2,3,4-tetrahydro-6-bromo - 9-oxo-1,4-ethanonaphthalene-2,3-exodicarboxylic anhydride in 150 ml. of diglyme. The mixture was refluxed for two hours and the solvent is distilled off until the vapor temperature reaches 160° C. The clear solution was cooled and then poured on a mixture of 200 g. ice and 300 ml. water to give a solid product. Crystallization of the product gave N-methyl-1,2,3,4-tetrahydro-6-bromo-9-oxo-1,4-ethanonaphthalene-2,3-exo-dicarboximide, M.P. 175–177° C.

A stirred solution of 0.1 mole of the dicarboximide in a solution containing 100 ml. of methanol, 45.0 g. of dimethylsulfite and 0.5 ml. of methane sulfonic acid was slowly heated to reflux. After a vigorous evolution of sulfur dioxide takes place, the clear solution was refluxed for 16 hours. The reaction mixture was then cooled to 20° C. and maintained at this temperature while a suspension of 1.0 gm. of sodium methoxide in 10.0 ml. of methanol was added, followed by 100 ml. of cold 40% sodium hydroxide solution. The product which separates was taken up in dichloromethane. The dichloromethane extract was washed twice with an equal volume of water and dried over magnesium sulfate. Removal of water and of the solvent in vacuo gave a residue which was recrystallized from ethyl acetate/petroleum ether to give N-methyl - 1,2,3,4 - tetrahydro-6-bromo-9,9-dimethoxy-1,4-ethanonaphthalene - 2,3 - exo-dicarboximide, M.P. 151–153° C.

A solution of 0.1 mole of the dimethyl ketal in 100 ml. of glyme was added slowly to a stirred suspension of 7.6 g. of sodium borohydride in 150 ml. of glyme. The mixture was heated to 60° C. and 28.4 g. of boron trifluoride etherate was added at a rate sufficient to maintain reflux. The reaction mixture was then refluxed for 1 hour, cooled and poured into one liter of water containing enough sodium hydroxide to keep the resulting mixture basic. The organic material was extracted into benzene and the extract dried over magnesium sulfate. Removal of the benzene in vacuo left a residue which was dissolved in a mixture of 50 ml. of acetone, 50 ml. of water and 50 ml. of concentrated hydrochloric acid. The resultant solution was heated for one hour on a steam bath.

The acetone was removed from the solution by evaporation in vacuo and the clear acid solution was made strongly alkaline by the addition of excess 40% sodium hydroxide solution. The temperature of the reaction was kept between 10–15° C. during the addition.

The precipitated material was taken up in ether and the ether layer separated and dried over magnesium sulfate. The residue obtained after removal of the solvent in vacuo was sublimed to give 1,3,3a,4,9,9a-hexahydro-6-bromo - 2 - methyl-4,9-ethano-2H-benz[f]isoindol-10-one, M.P. 104–106° C.

Treatment of this ketone with malononitrile, sulfur and morpholine as described in Example 2 gives 2-amino-4,9-dihydro-7-bromo-12-methyl - 4,9(3',4') - pyrrolidinonaphtho[2,3-b]thiophene-3-carbonitrile.

EXAMPLE 7

2-amino-4,9-dihydro - 4 - benzyl - 12 - methyl - 4,9(3',4')-pyrrolidinonaphtho[2,3-b]thiophene-3-carbonitrile By substituting 1,3,3a,4,9,9a - hexahydro - 9 - benzyl-2-methyl-4,9-ethano-2H-benz[f]isoindol-10-one for the ketone employed in Example 2, the corresponding compound, 2-amino-4,9-dihydro-4-benzyl - 12 - methyl - 4,9 (3',4')pyrrolidinonaphtho[2,3-b]thiophene - 3 - carbonitrile, can be obtained.

Formulation

The active ingredients of this invention can be employed in a number of useful compositions according to the present invention. Dosage forms such as tablets, capsules, powder packets, or liquid solutions, suspensions or elixers can be prepared for oral administration. Sterile liquid formulations such as solutions or suspensions can be prepared for parenteral use. Dosage forms such as solutions, suspensions, emulsions, and ointments can be prepared for topical administration.

In such compositions, the active ingredient will ordinarily always be present in an amount of at least 0.5% by weight based on the total weight of the composition and not more than 90% by weight.

Besides the active ingredient of this invention, the pharmaceutical composition will contain a solid or liquid non-toxic pharmaceutical carrier for the active ingredient.

In one embodiment of a pharmaceutical composition of this invention, the solid carrier is a capsule which can be of the ordinary gelatin type. In the capsule will be from about 30–60% by weight of a compound of Formulas 1 and 2 and 70–40% of a carrier. In another embodiment, the active ingredient is tableted with or without adjuvants. In yet another embodiment, the active ingredient is put into powder packets and employed. These capsules, tablets and powders will generally constitute from about 5% to about 95% and preferably from 25% to 90% by weight. These dosage forms preferably contain from about 5 to about 500 milligrams of active ingredient, with from about 25 to about 250 most preferred.

In another embodiment from 0.5 to 10% of the active ingredient is incorporated into from 99.5 to 90% of a suitable ointment base.

The pharmaceutical carrier can, as previously indicated, be a sterile liquid such as water and oils, including those of petroleum, animal, vegetable or synthetic origin, for example, peanut oil, soybean oil, mineral oil, sesame oil, and the like. The general, water saline, aqueous dextrose (glucose) and related sugar solutions and glycols such as propylene glycol or polyethylene glycols are preferred liquid carriers, particularly for injectible solutions. Sterile injectible solutions such as saline will ordinarily contain from about 0.5% to 25% and preferably about 1 to 10% by weight of the active ingredient.

The active ingredient can be prepared for oral administration in a suitable suspension or syrup, in which the active ingredient ordinarily will constitute from about 0.5 to 10% and preferably about 2 to 5%, by weight. The pharmaceutical carrier in such composition can be a watery vehicle such as an aromatic water, a syrup or a pharmaceutical mucilage.

The active ingredient can be prepared for topical administration in a suitable solution, suspension, liquid emulsion, ointment or paste in which the active ingredient ordinarily will constitute from about 0.5 to 10.0% by weight. The pharmaceutical carrier in such compositions can be water; an organic solvent such as ethyl alcohol, glycerin, or the like; a suitable emulsion; or a suitable ointment base such as petrolatum, hydrophilic petrolatum, hydrophilic ointment, and the like.

Suitable pharmaceutical carriers are described in "Remington's Pharmaceutical Sciences," by E. W. Martin, a well-known reference text in this field.

In addition to the exemplary illustrations above, the following examples further explain the present invention.

EXAMPLE 8

A large number of unit capsules are prepared by filling standard two-piece hard gelatin capsules each with 50 milligrams of powdered 2-amino-4,9-dihydro-12-methyl-4,9(3',4')-pyrrolidinonaphtho[2,3 - b]thiophene - 3 - carbonitrile hydrochloride, 320 milligrams of anhydrous lactose, 8 milligrams of magnesium stearate and 40 mg. of talc.

EXAMPLE 9

Example 7 is repeated except that soft gelatin capsules are used and powdered 2-amino-4,9-dihydro-12-methyl-4, 9-(3',4')-pyrrolidinonaphtho[2,3-b]thiophene - 3 - carbonitrile is first dispersed in soybean oil.

EXAMPLE 10

A large number of tablets are prepared by conventional procedures so that the dosage unit is 50 milligrams of ethyl 2-amino-4,9 - dihydro - 12 - phenethyl - 4,9(3',4')-pyrrolidinonaphtho[2,3-b]thiophene-3-carbonitrile hydrochloride, 5 milligrams of gelatin, 1.5 milligrams of magnesium stearate and 100 milligrams of lactose. Slow release pills or tablets can also be used, by applying appropriate coatings. A coating may also be applied to increase palatability.

EXAMPLE 11

A parenteral composition suitable for administration by injection is prepared by stirring 5% by weight of ethyl-2-amino-4,9 - dihydro - 12 - phenethyl - 4,9(3',4') - pyrrolidinonaphtho-[2,3-b]thiophene - 3 - carbonitrile hydrochloride in Sodium Chloride Injection, U.S.P., and sterilizing the solution by appropriate methods.

EXAMPLE 12

An ointment suitable for topical application is prepared by dissolving 5% of 2-amino-4,9-dihydro-12-methyl - 4,9-(3',4')pyrrolidinonaphtho[2,3 - b]thiophene - 3 - carbonitrile hydrochloride in a minimum amount of water and incorporating the resultant solution in 95% hydrophilic ointment, U.S.P. XVIII.

A large variety of compositions according to this invention can thus readily be made by substituting other compounds of this invention, and including specifically but not limited to compounds of this invention that have specifically been named hereinbefore. The compounds will be used in the amounts indicated in accordance with procedures well known and described in the Martin text mentioned above.

Utility

As indicated above, the compounds of this invention surprisingly possess utility as both analgetic agents and antiviral agents. Therefore, one aspect of this invention relates to a method of effecting analgesic in a warm-blooded animal which comprises administering an analgetic effective amount of a compound of this invention to a warm-blooded animal suffering from pain. In particular, the analgesic activity of 2-amino - 4,9 - dihydro - 12-methyl - 4,9(3',4') - pyrrolidinonaphtho[2,3-b]thiophene-3-carbonitrile is characterized by rapid onset of action, high oral potency and the ability to alleviate deep-seated pain.

When used as an analgesic, the above-named compound can be administered in doses ranging from 0.01 mg./kg.-day to 20 mg./kg.-day in single or divided doses with the range of 0.05 mg./kg.-day to 10 mg./kg.-day being preferred and the most preferred range being 0.1 mg./kg.-day to 1 mg./kg.-day. It will be understood that factors such as the intensity of the pain as well as the age, health, and weight will normally be taken into consideration when determining the effective dose.

The effectiveness of 2-amino-4,9-dihydro-12-methyl-4,9(3',4')-pyrrolidinonaphtho[2,3-b]thiophene - 3 - carbonitrile as an analgesic agent can be demonstrated by the ability of said compound to antagonize the phenylquinone writhing syndrome in mice. The test employed, known as the phenylquinone writhing test, to determine analgesic activity, is a modification of the method described by E. Siegmund et al., Proc. Soc. Exptl. Biol. Med., 95, 729 (1957). It is well established that mice when injected intraperitoneally with phenylquinone (phenyl - p - benzoquinone) develop a characteristic writhing syndrome. It has also been established that this writhing syndrome is prevented by all known analgesic drugs including aspirin, codeine, morphine, meperidine, nalorphine, pentazocine and D-propoxyphene and that drug potency in this test correlates well with the potency of known analgetics.

Briefly, the phenylquinone writhing test is conducted as follows:

The test compound is injected into the test mice subcutaneously into the neck nape or are given orally by intubation. Fifteen or 30 minutes after drug administration depending on time of peak action, 0.25 ml. of 0.02% phenylquinone is injected intraperitoneally. The mice are observed for the writhing syndrome for ten minutes. Failure to writhe even once during the observation period constitutes analgesia. The results of the test are reported in Table I below. The results are expressed in terms of the number of mice tested which fail to writhe during the observation period.

The effectiveness of 2-amino-4,9-dihydro-12-methyl-4,9(3',4')-pyrrolidinonaphtho[2,3 - b] - carbonitrile as an analgesic agent can also be demonstrated by the ability of said compound to eliminate response to a painful stimulus, heat applied to a rat's tail, either by blocking transmission of the pain impulse or by altering the reaction of the test subject to pain. The test employed, known as the tail flick test, is a modification of the method described by D'Amour and Smith, J. Pharmacol. Exp. Therap., 72, 761 (1941) using an apparatus described by Bass and Vander Brook, J. Amer. Pharmaceut. Assoc. 41, 569 (1952).

Briefly, the tail flick test is conducted as follows:

The test compound is administered to the test rat either intraperitoneally or orally at the dose level indicated in Table II. Light from an automobile headlight is focused on the tails of the test subjects with sufficient intensity to cause an untreated rat to move (flick) its tail in about ten seconds. Drug treated rats with tail-flick response times equal to or greater than 2.5 times the average response time of the vehicle treated (control) rats are considered to be analgesic. The results of the above-described tests are reported in Table II below. The data are obtained at the time of peak drug activity.

TABLE II

| Test compound | Route of administration | $ED_{50}$ in mg./kg. | Dose administered, mg./kg. | Number of mice | |
|---|---|---|---|---|---|
| | | | | Blocked | Tested |
| 2-amino-4,9-dihydro-12-methyl-4,9(3',4')-pyrrolidinonaphtho[2,3-b]thiophene-3-carbonitrile hemihydrate. | Intraperitoneal | 4.3 | 32.0 | 10 | 10 |
| | | | 16.0 | 10 | 10 |
| | | | 8.0 | 10 | 10 |
| | | | 4.0 | 4 | 10 |
| Control (vehicle only) | | | 0.0 | 0 | 10 |
| 2-amino-4,9-dihydro-12-methyl-4,9(3',4')-pyrrolidinonaphtho[2,3-b]thiophene-3-carbonitrile hemihydrate. | Oral | 35.0 | 200.0 | 10 | 10 |
| | | | 100.0 | 10 | 10 |
| | | | 50.0 | 9 | 10 |
| | | | 25.0 | 2 | 10 |
| Control (vehicle only) | | 0.0 | | 0 | 10 |

The antiviral activity of the compounds of this invention is characterized by the effectiveness of said compounds in the prevention, treatment or mitigation of herpesvirus infections of warm-blooded animals such as those caused by *Herpesvirus hominis* type 1 and *Herpesvirus hominis* type 2.

It will be understood that a "warm-blooded animal" is a member of the animal kingdom possessed of a homeostatic mechanism and includes mammals and birds.

The compounds of this invention can be administered in the antiviral treatment according to this invention by any means that effects contact of the active ingredient compound with the site of virus infection in the body of a warm-blooded animal. It will be understood that this includes the site prior to infection as well as after. For example, administration can be by the parenteral, topical or oral route.

The dosage administered will be dependent upon the virus being treated, the age, health and weight of the recipient, the extent of infection, kind of concurrent treatment, if any, frequency of treatment, route of administration and the nature of the effect desired. Generally, a daily dosage of active ingredient compound will be from about

TABLE I

| Test compound | Route of administration | $ED_{50}$ in mg./kg. | Dose administered, mg./kg. | Number of mice | |
|---|---|---|---|---|---|
| | | | | Blocked | Tested |
| 2-amino-4,9-dihydro-12-methyl-4,9(3',4')-pyrrolidinonaphtho[2,3-b]thiophene-3-carbonitrile hemi-hydrate. | Subcutaneous [1] | 1.5 | 2.7 | 19 | 20 |
| | | | 1.8 | 15 | 20 |
| | | | 1.2 | 3 | 20 |
| | | | 0.8 | 1 | 20 |
| | | | 0.53 | 0 | 20 |
| Control (no drug) | | | 0 | 0 | 20 |
| 2-amino-4,9-di-hydro-12-methyl-4,9(3',4')-pyrrolidinonaphtho[2,3-b]thiophene-3-carbonitrile hemi-hydrate. | Oral [1] | | 10.00 | 20 | 20 |
| | | | 6.31 | 13 | 20 |
| | | | 3.98 | 11 | 20 |
| | | | 2.51 | 2 | 20 |
| | | | 1.58 | 2 | 20 |
| Control (no drug) | | | 0.00 | 1 | 20 |

[1] Phenylquinone given 15 minutes after test compound.

0.5 to 50 milligrams per kilogram of body weight, although lower, such as 0.1 milligram per kilogram or higher amounts can be used. Ordinarily, from 1 to 20 and preferably 2 to 10 milligrams per kilogram in one or more applications per day is effective to obtain the desired result.

The antiviral activity of the compounds of this invention was demonstrated when a medium containing at least 10 mcg./ml. of 2 - amino-4,9-dihyro-12-allyl-4,9(3',4')-pyrrolidinonaphtho[2,3-b]thiophene-3-carbonitrile, hydrochloride is applied to $20 \times 10^6$ rabbit kidney cells which had been infected with 200 plaque-forming units of *Herpesvirus hominis* type 1/H4 virus with the result that complete inhibition of the cytopathic effect of the virus was noted.

2 - amino-4,9-dihydro-12-phenethyl-4,9-(3',4')-pyrrolidinonaphtho[2,3-b]thiophene-3-carbonitrile when applied at a concentration of 10 mcg./ml. was also effective in preventing damage to mouse embryo cells which had been infected with 300 plaque-forming units of *Herpesvirus hominis* type 2/Ala./SM virus.

A local application of 20 mcg. of 2-amino-4,9-dihydro-12 - ethyl-4,9(3',4')-pyrrolidinonaphtho[2,3-b]thiophene-3-carbonitrile to a cell monolayer of rabbit kidney cells, infected with *Herpesvirus hominis* type 1/H4 virus effectively inhibited the cytopathic effect of the virus on said cells.

A local application of 80 mcg. of 2-amino-4,9-dihydro-12 - methyl - 4,9(3',4') - pyrrolidinonaphtho[2,3-b]thiophene-3-carbonitrile to a cell monolayer of rabbit kidney cells infected with *Herpesvirus hominis* type 1/H4 virus effectively inhibited the cytopathic effect of the virus on said cells.

The effectiveness of 2 - amino - 4,9-dihydro-12-allyl-4,9 (3',4') - pyrrolidinonaphtho[2,3-b]thiophene - 3 - carbonitrile in combatting *Herpesvirus hominis* type 1/H4 virus infection in guinea pigs was demonstrated as follows:

Guinea pigs were shaved and infected intradermally on 18 sites, 9 sites per side, with *Herpesvirus hominis* type 1/H4 virus. The test compound, 2-amino-4,9-dihydro-12-allyl - 4,9(3',4') - pyrrolidinonaphtho[2,3-b]-thiophene-3-carbonitrile dissolved in a vehicle consisting of 90% dimethylsulfoxide and 10% water was administered topically at 24, 48, 72 and 96 hours after infection. Seven days after infection, the treated guinea pigs were compared with a control group of guinea pigs infected with the virus but which had been treated with the vehicle only. Control animals showed 86% positive lesions whereas animals treated with 0.375 mg./site of the test compound showed only 39% positive lesions.

What is claimed is:

1. A compound of the formula

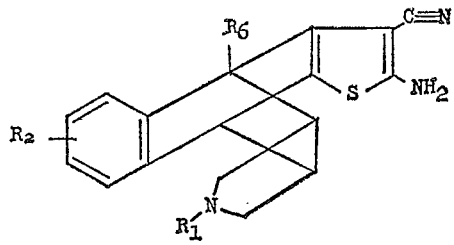

where
$R_1$ is hydrogen, alkyl of from one through six carbon atoms, alkenyl of from three through five carbon atoms containing the double bond in other than the "1" position, propargyl, cyclopropylmethyl or phenethyl;
$R_2$ is hydrogen, chlorine, bromine, fluorine, trifluoromethyl, —NO₂ or OR₃
where $R_3$ is hydrogen, alkyl of one through three carbon atoms or

where $R_5$ is hydrogen or alkyl of one through three carbon atoms,
$R_6$ is hydrogen, alkyl of one through three carbon atoms, benzyl or phenethyl; and
the pharmaceutically acceptable salts of said compounds.

2. A compound of claim 1, where
$R_1$ is hydrogen, alkyl of from one through six carbon atoms, alkenyl of from three through five carbon atoms containing the double bond in other than the "1" position, or cyclopropylmethyl;
$R_2$ is hydrogen, chlorine, bromine or fluorine;
$R_6$ is hydrogen or alkyl of one through three carbon atoms and the pharmaceutically acceptable salts of said compounds.

3. A compound of claim 1, where
$R_1$ is phenethyl;
$R_2$ is hydrogen, chlorine, bromine or fluorine;
$R_6$ is hydrogen or alkyl of one through three carbon atoms, and
the pharmaceutically acceptable salts of said compounds. pounds.

4. The compound of claim 1 which is 2-amino-4,9-dihydro - 12 - methyl-4,9(3',4')-pyrrolidinonaphtho[2,3-b]-thiophene-3-carbonitrile.

References Cited
UNITED STATES PATENTS
3,577,431  5/1971  Flickinger et al. ___ 260—326.1

JOSEPH A. NARCAVAGE, Primary Examiner

U.S. Cl. X.R.
260—326 C; 424—274